(12) United States Patent
Banks et al.

(10) Patent No.: US 8,912,806 B2
(45) Date of Patent: Dec. 16, 2014

(54) METHOD OF CUTTING AND TESTING A PIPELINE CUT UNDER WATER OR UNDER A SEABED

(75) Inventors: Steve Banks, Guernsey (GB); Peter Robinson, Lancaster (GB); Anthony Peyton, Bolton (GB); David Armitage, Tilston (GB)

(73) Assignee: Genesis Oil & Gas Consultants Limited (GB)

( * ) Notice: Subject to any disclaimer, the term of this patent is extended or adjusted under 35 U.S.C. 154(b) by 410 days.

(21) Appl. No.: 13/119,212

(22) PCT Filed: Sep. 25, 2009

(86) PCT No.: PCT/GB2009/051256
§ 371 (c)(1), (2), (4) Date: May 20, 2011

(87) PCT Pub. No.: WO2010/035042
PCT Pub. Date: Apr. 1, 2010

(65) Prior Publication Data
US 2011/0209540 A1 Sep. 1, 2011

(30) Foreign Application Priority Data
Sep. 26, 2008 (GB) .................................. 0817675.2

(51) Int. Cl.
G01R 27/04 (2006.01)
E21B 29/00 (2006.01)
G01S 13/88 (2006.01)
E21B 29/12 (2006.01)
E21B 47/12 (2012.01)

(52) U.S. Cl.
CPC ............... *E21B 47/122* (2013.01); *E21B 29/00* (2013.01); *G01S 13/88* (2013.01); *E21B 29/12* (2013.01)
USPC .......................................... 324/642; 324/633

(58) Field of Classification Search
CPC .... E21B 47/12; G01N 29/2412; G01N 27/00; G01N 27/82; G01N 27/902; G01S 13/88; G01S 7/527; G01V 15/00
See application file for complete search history.

(56) References Cited

U.S. PATENT DOCUMENTS

| 3,195,236 | A | * | 7/1965 | Green et al. | 33/777 |
| 3,600,674 | A | * | 8/1971 | Roberts et al. | 324/557 |
| 4,289,019 | A | * | 9/1981 | Claytor | 73/40.5 A |
| 4,970,467 | A | * | 11/1990 | Burnett | 324/637 |

(Continued)

FOREIGN PATENT DOCUMENTS

| EP | 0 399 583 | 11/1990 |
| GB | 1517768 | 7/1978 |

(Continued)

OTHER PUBLICATIONS

Search Report dated Feb. 6, 2009 conducted on equivalent patent application UK 0817675.2.

(Continued)

*Primary Examiner* — Vinh Nguyen
(74) *Attorney, Agent, or Firm* — Ostrolenk Faber LLP

(57) ABSTRACT

Disclosed is a method to determine whether a pipeline has been cut, the method including (a) transmitting an electromagnetic signal through the pipeline; (b) monitoring any reflected signal(s); and (c) interpreting the reflected signal to determine whether the pipeline has been cut.

16 Claims, 3 Drawing Sheets

(56) References Cited

U.S. PATENT DOCUMENTS

| | | | |
|---|---|---|---|
| 4,996,879 A * | 3/1991 | Kruka et al. | 73/592 |
| 5,189,374 A * | 2/1993 | Burnett | 324/534 |
| 5,207,661 A | 5/1993 | Repschlager | 604/317 |
| 6,686,745 B2 | 2/2004 | Bass | 324/522 |
| 6,937,030 B2 | 8/2005 | Liney et al. | 324/642 |
| 2008/0191706 A1 | 8/2008 | Burnett et al. | 324/533 |
| 2009/0013806 A1* | 1/2009 | Miller et al. | 73/865.8 |

FOREIGN PATENT DOCUMENTS

| | | |
|---|---|---|
| GB | 2154742 A | 9/1985 |
| JP | 55-2922 | 1/1980 |
| JP | 2-187684 A | 7/1990 |
| WO | WO 96/28743 | 9/1996 |
| WO | WO 00/54028 A1 | 9/2000 |
| WO | WO 2007/062221 | 5/2007 |

OTHER PUBLICATIONS

Notification Concerning Transmittal of International Preliminary Report on Patentability with a mailing date of Apr. 7, 2011, International Preliminary Report on Patentability, Written Opinion of the International Searching Authority issued in corresponding International Application No. PCT/GB2009/051256.

* cited by examiner

Oil Pipe conductor cut with fresh water

METHOD OF CUTTING AND TESTING A PIPELINE CUT UNDER WATER OR UNDER A SEABED

CROSS REFERENCE TO RELATED APPLICATIONS

The present application is a 35 U.S.C. §371 National Phase conversion of PCT/GB2009/051256, filed Sep. 25, 2009, which claims benefit of British Application No. 0817675.2, filed Sep. 26, 2008, the disclosure of which is incorporated herein by reference. The PCT International Application was published in the English language.

BACKGROUND OF THE INVENTION

The present invention involves a method of testing a pipeline cut, particularly but not exclusively in or for an underwater or below the seabed pipeline, and particularly using time reflectometry techniques such as time domain reflectometry (TDR).

There is a strict legal framework of national, regional and international regulations which govern how operators decommission offshore facilities. Abandonment of wells and the decommissioning of offshore platforms are big challenges for the oil and gas industry that require considerable resources and investment in executing the work in an environmentally safe and economical way. It is estimated that around 120-150 platforms and 600-1000 wells are abandoned in the Gulf of Mexico alone each year and this figure continues to rise as other fields reach the decommissioning phase.

A typical platform decommissioning programme consists of the following activities, which may span a period of 1-4 years depending on the size of the platform and its location:
Well isolation
Well conductor removal
Plant cleaning
Preparation for platform removal
Platform removal Conductor removal is an important and challenging phase in the decommissioning programme due to the significant number and lengths of the conductors to be removed.

There are several ways to cut and remove conductor casings once the wells have been abandoned. Typically explosive devices or abrasive water jet cutting (AWJC) tools are used to sever the conductor approximately 5 m (or 15 ft) below the sea bed or mud line, and the casings are then removed with heavy lift equipment. Operators tend to prefer the use of AWJC tools on drilling casings, as explosive cutting has higher safety concerns, and causes the cut point to flare out, which can lead to complications (and possibly the need for further cutting by ROV/divers) when removing the string through the conductor guides.

Naturally, it is desired to ensure that the cut through the conductor has been successful, but confirming the success of a through cut of the conductor string by the methods mentioned above is also problematic. When explosive cutting is used, the conductor string physically 'drops' as proof of a successful cut. However with AWJC tools, the process is more complicated and requires a top tension to be applied to the conductor during the cutting process. This requires a shock load-compensated jack that has to pull load of up to 300 tons to apply the top tension to the casing during the cutting process, but the jack must be able also allow immediate release once the casing under tension is cut free. This system is very equipment intensive, costly and may take some time to install and operate as the jack also has to overcome the initial soil friction on the outer casing. As advances in the AWJC systems move towards 'rigless' designs (i.e. with no drilling derrick) the use of top tensioned jacks is becoming less compatible with such systems.

SUMMARY OF THE INVENTION

It is an object of the present invention to provide a simply method of testing the through cut of a pipeline.

According to a first aspect of the present invention, there is provided a method of testing the through cut of a pipeline comprising at least the steps of:
(a) transmitting an electromagnetic signal through the pipeline;
(b) monitoring any reflected signal(s); and
(c) interpreting the or each reflected signal to test for the through cut of the pipeline.

In this way, a non-invasive electromagnetic signal can be passed through, along, across or otherwise within the pipeline, and any reflected signal(s) can be interpreted and analysed based on one or more characteristics of the received signal(s) to ascertain the change in the conductivity of the pipeline due to the cutting thereof, in particular when or whether the cutting of the pipeline is complete or has been completed such that there is a through cut. No reflected signals may also be indicative of the status of the cutting of the pipeline.

The pipeline may be any suitable pipeline able to allow the transmission or conveyance an electromagnetic signal in some suitable manner, and optionally able to transmit and/or convey one or more reflected signals, either in return, or along one or more other conductive paths to a location where such reflected signal(s) can be monitored and detected, and optionally also interpreted.

The method of the present invention is particularly suitable where access to the location of the cut of the pipeline is difficult and/or the location of the cut is not externally accessible or visible directly or remotely. Such pipelines include underwater pipelines, and in particular below the seabed or below the mud line pipelines. Such pipelines can include hydrocarbon conductors such as oil drilling conductors, whose removal a distance below the seabed or mud line, such as 5 m (or 15 ft) below, is required as part of the decommissioning of an offshore platform.

The pipeline may involve one or more strings, in particular being a multi-string pipeline. Such strings can be pipe-in-pipe pipelines, with one or more of the strings being concentrically arranged.

A typical drilling conductor is a multi-string pipeline, comprising at least two, commonly at least three or four, concentric strings.

Such pipelines can also comprise and/or be formed by the location of one or more casings, usually concentrically arranged.

Such pipelines can also be termed 'risers', and are generally for passing hydrocarbons such as oil from beneath a seabed or mud line to a platform, in particular an off-shore platform.

There are many types and variations in shapes, dimensions and forms of pipelines used and known in the oil industry. By way of example only, one typical offshore drilling conductor string comprises a number of concentrically located casings, each of which extends to progressively deeper levels below the mud line. A typical installation may comprise an approximately 76 cm (30 inch) outer metallic casing which is cemented into the seabed to a depth of around 100 m. Inside of this outer conductor pile, there can be a number of smaller diameter casings. The number and size of the casings in each conductor string will vary from well to well, but as a minimum, it typically consists of an outer conductor of 76 cm (30 inches) and an inner liner of approximately 18 cm (7 inch) diameter.

Typically there are several more casings, which can include approximately 51 cm (20 inch) casing and approximately 23 cm (9 inch) production casing. As such, in electrical terms, these structures can represent one waveguide as a transmission pathway or line which is able to carry an electromagnetic signal.

Such a transmission line is a special case of a waveguide. Waveguides may also take the form of a region of relatively low conductivity dielectric sandwiched between two regions of relatively high conductivity. Thus, such a waveguide is also created by a partial or complete cut separating two parts of a pipeline.

Further types and forms of pipelines used in the oil industry are not described herein.

The electromagnetic signal of step (a) may be created by any suitable signal generator, and conveyed using any suitable coupling devices or contacts or antenna.

One or more characteristics of the electromagnetic signal can be varied, such as the magnitude and/or phase of the signal at particular frequencies, and/or the amplitude of the signal at particular instants in time, and this can assist in considering the interpretation of the reflected signal(s) and thus determination of the extent of any discontinuities in the pipeline. Such characteristics may be based on variations in the electrical signal extracted from the electromagnetic signal wave.

For example, an electrical signal used to generate the electromagnetic signal of step (a) may comprise one or more components and/or pulses, and is preferably one or more voltage pulses, generally provided by a voltage pulse generator, although other forms of electromagnetic or electrical test signals can also be used to create reflected signals, such as a frequency swept sine wave or pseudo random noise, and the present invention is not limited to time domain methods with impulses or step waveforms.

The electromagnetic signal can be applied between any pair of electromagnetically conductive but mutually insulated parts or portions of the pipeline. For example, where the pipeline comprises a multi-string pipeline comprising two or more strings, it is possible to launch the electromagnetic pulse along the waveguide formed by the pipeline.

Where the pipeline comprises a multi-string pipeline, an electromagnetic signal can be provided to one conducting string, and a return line can be provided from one or more of the other strings.

Thus, according to one embodiment of the present invention, step (a) comprises transmitting an electromagnetic wave along the pipeline, in particular between inner and outer casings of a pipeline having such casings.

In another example, the electromagnetic signal could be applied across the pipeline at the cut, such that the cut acts as a waveguide.

Thus, according to another embodiment of the present invention, step (a) comprises transmitting an electromagnetic wave across the pipeline, in particular across the cut in the pipeline, i.e. between the two separating parts of pipeline.

According to one embodiment of the present invention, the electrical signal generating the electromagnetic signal comprises one or more voltage pulses.

According to another embodiment of the present invention, the electrical signal generating the electromagnetic signal comprises one or more frequency swept sine waves.

Reflectometry can have a time domain basis, a frequency domain basis, and/or a cross-correlation with widened signals, etc.

Preferably, the method of the present invention uses time domain reflectometry. Time Domain Reflectometry (TDR) is a well known and proven technology for inspecting electrical transmission lines and cable harnesses.

In using TDR, the skilled person is able to take account of known inhomogeneities, particularly when the or each reflected signal is interpreted using a system which is calibrated to take account of such inhomogeneities, for example by the use of one or more software analysis programs or processes.

Electrical TDR relies upon the ability of an item under test to support the transmission of electromagnetic waves. If a short pulse is transmitted at one end of a transmission line for example, and if the transmission line has a constant characteristic impedance, $Z_O$ and is terminated with a resistance equal to $Z_O$, then the pulse will be completely absorbed by the termination resistance. If however there are discontinuities in the characteristic impedance of the transmission line or the termination of the transmission line is not matched, then a proportion of the transmitted wave or signal will be reflected from each discontinuity. These reflected waves will be further reflected as they encounter more discontinuities. A proportion of the energy in the reflections eventually returns to the point of transmission where it may be monitored as the received signal(s). The relative timing and magnitude of the monitored pulses is dependent upon the dielectric properties of the medium and the location of the discontinuities.

Both partial and complete cuts though one or more strings of a pipeline result in discontinuities. In these cases, discontinuities may result from a number of factors. For example, a partial or complete break in a steel tube represents a very short section of relatively high-resistance electrical-conductor. The conductivity under these circumstances is dependent upon the particular material within the space created by the cutting action or process, herein termed the "cut".

A pipeline that is partially cut results in a disturbance of the propagation of the wave within the transmission line or waveguide, and is therefore another form of discontinuity. Thus, when for example two or more strings have been cut, the water forms an electrical circuit that connects the strings. Water has a relative permittivity of about 80, and seawater may have a conductivity up to 5 $Sm^{-1}$. The load presented to the transmission line thus forms a discontinuity.

Thus, where a pipeline has been fully or completely cut to create a through cut, there will be one or more reflected signals created by the discontinuity of the electromagnetic signal across the cut or cutline.

Where the cut of the pipeline is not (yet) complete, this can be shown by the presence of one or more other reflected signals caused by the extent of the cut as is, as well as the continuity of the electromagnetic signal along the pipeline beyond the location of the cutting.

In this way, the interpretation of the received signal(s), especially in comparison with standard or other pre-determined signals or signal patterns, can be used to indicate when the pipeline has been completely cut. This then allows the operator to start other operations, such as lifting the cut pipeline, only once the operator has confirmation of a completed cut, rather than acting precipitously, in particular straining a lifting jack whilst the pipeline is still not cut through and so is in some way still connected to the remainder of the pipeline, which may be very securely embedded.

In the case of the conductivity of grout material in a pipeline being sufficiently low as to allow the propagation of electromagnetic waves along the pipeline, based on using a transmission line that can be provided by the concentric arrangement of steel pipes and grout, the electromagnetic signal may be applied and the reflections monitored at the top of the pipeline.

An alternative is to apply and monitor the electromagnetic pulse locally between the two parts of the already completely cut inner string in such a way that the pulse may propagate along the gap formed by the cutting process. This configuration constitutes a type of waveguide provided that the conductivity of the dielectric within the gap is low. Since seawater is used within the AWJC this electromagnetic pulse is generally unable to propagate during the cutting process, since the gap is typically filled with a combination of seawater and abrasive material such as garnet, which form a relatively high conductivity dielectric. Thus preferably, either freshwater is temporarily used for the cutting process when it is near completion or the cutting area is flushed with, air to enable the electromagnetic pulse to propagate within the cut.

A number of factors can contribute to discontinuities of the impedance of a transmission line or waveguide. Where the transmission line is a pipeline such as an offshore drilling conductor string, there are inhomogeneities within the grout used between the strings, including both variations in the mixture and air gaps will result in discontinuities.

Furthermore, the bottom end of a drilling conductor is usually embedded within the mud of the seabed. The impedance presented to the end of such a conductor is unlikely to be perfectly matched to the characteristic impedance of the transmission line, and so represents another discontinuity. Depending upon the proportion of seawater within the mud, the impedance presented might be either higher than that of the transmission line in the case of drier mud, or lower in the case of wet mud. There will also be a reactive component to the impedance presented due to the permittivity of the mud.

In the case of the electromagnetic pulse being applied locally to the cut into the waveguide formed by the partial or complete cut, discontinuities may exist due to material forming bridges between the two conductors of the waveguide. Bridges may result from incomplete cutting of outer strings and eventually the mud surrounding the pipeline.

In using TDR, the skilled man is able to take account of known inhomogeneities, particularly when the or each reflected signal is interpreted using a system which is calibrated to take account of such inhomogeneities, for example by the use of one or more software analysis programs or processes.

Thus, by applying a short electromagnetic signal such as an electrical pulse between two steel pipes at the top of the oil conductor, if possible, or by applying a short electromagnetic pulse locally to the cut between the two parts of the completely cut inner string and by observing the reflected signals, the moment at which the conductor is completely severed can be determined.

One or more characteristics of the electromagnetic signal can be varied, and this can assist in considering the interpretation of the reflected signal(s) and thus determination of the extent of the cut of the pipeline. For example, the electromagnetic signal could be repeatedly and/or rhythmically generated, each signal having a time period of 10-50 nanoseconds, such as a 30 nanosecond pulse. A good signal-to-noise ratio could be provided using a voltage of at least 20-30 volts, such as 100 volts or higher.

To monitor the or each reflected signal, a digital oscilloscope with a frame averaging facility could be used. Alternatively, a sinusoidal excitation may be used. If so, the response of the pipeline over a range of frequencies of below or around 50 or 100 kHz, and up to at least 1 GHz or beyond, may be used. The spectral data may then be transformed back to the time domain to recover the TDR response. The equipment may also comprise a vector network analyser (VNA). The forms of electromagnetic signal, and the forms of interpreting reflected signals using TDR, are known to those skilled in the art.

In one embodiment of the present invention, the method of the present invention is able to monitor the progress of cutting of a pipeline in real time. Thus, the present invention is able to inform an operator of the progress of a cut, and in particular when the cut is complete such that other operations, such as tensioning a lifting jack, can occur.

The cutting of the pipeline may be carried out by any suitable cutting means, tools, device, apparatus or unit. For circular pipelines, abrasive water jet cutting (AWJC) tools are known in the art, and are able to pass along the interior of the pipeline to a particular location, and then operate. High pressure water cutters can be used with an abrasive grit in solution, such as garnet, and the cutting process is usually carried out from the inside of an innermost string of a pipeline.

Being underwater, generally in seawater, the cutting of the pipeline generally occurs in a seawater medium.

According to another embodiment of the present invention, there is provided at least partially, preferably fully, replacing the medium in the pipeline at the location of the cut with a different medium during the method of testing the through cut of the pipeline.

The different medium may comprise one or more fluids, being any combination of one or more liquids and/or gases able to at least partially, usually substantially or wholly, fill the pipeline to replace the existing medium therein. Where the pipeline is an underwater pipeline, the existing medium of a pipeline to be removed by cutting, especially below the sea bed, is usually wholly or substantially seawater, and preferably the different medium has a lower conductivity than seawater.

There are many media known to have a lower conductivity than seawater, optionally involving one or more gases such as air.

In one embodiment of the present invention, wherein the pipeline is an underwater or below the sea bed pipeline, the different medium is fresh water.

The different medium can be used to fill the pipeline at any one or multiple stages of the cutting of the pipeline or thereafter. For example, the pipeline could be filled with a different medium prior to the start of any cutting, and the different medium is maintained within the pipeline throughout the cutting process. Where the maintenance of the different medium in the pipeline may be difficult due to leakage or energy requirements, the pipeline may be at least partially filled with a different medium at or near the completion of the cut, for example only after completion of 70%, 80%, 85%, 90%, or even 95% of the cut. In this way, less energy is required to fill and/or maintain the different medium in the pipeline during the final part or the completion of the cut, when testing of the cut is most particularly desired.

The filling of the pipeline with the different medium may be carried out by any known procedure or process, and may involve pressurising the different medium and/or positive withdrawal of the existing medium in the pipeline, to assist the filling. For example, one or more pumps could be used to pump pressurised fresh water or air into an existing seawater-filled pipeline.

The different medium in the pipeline changes the conductivity therein, particularly at or near the cut, preferably to enhance the reflected signal(s) and/or better differentiate the reflected signal(s) compared to the transmitted electromagnetic signal(s). For example, in comparison with seawater, it can be considered for the present invention that both fresh water and air have "zero" conductivity, such that the presence of fresh water or air in the pipeline does not present a shunt across the transmission of the electromagnetic signal down an underwater pipeline or within the waveguide formed by the gap created by the cutting process.

In another embodiment of the present invention, steps (a) and (b) are carried out from one end of the pipeline. For example, a metallic end-fitting is located and/or mounted at the end of the pipeline to which the required apparatus, units or devices are able to transmit an electrical signal to create the electromagnetic signal, and to seek one or more reflected signals. The reflected signal may be monitored using the same antenna as the transmitter unit, and measuring changes in high frequency impedance or S-parameter reflection coefficients such as S11. The analyser (for example an oscilloscope with TDR facility or a Vector Network Analyser) could have a system or mechanism to separate the forward and reflected waves to enable the reflected wave(s) to be isolated and analysed.

Additionally and/or alternatively, steps (a) and (b) are carried out in the pipeline, optionally using a pig (or other in-line tool). In this arrangement, a signal could be applied across the pipeline above and below the cut. The signal thus propagates in across the pipeline within the waveguide formed by the cut.

Pigs, etc. are well known devices used in pipelines, either being self mobile or propelled by one or more other devices or the fluid passing along the pipeline, so as to be able to provide one or more services in or along the pipeline from an internal position.

In another embodiment, the time of flight could be determined in steps (a) and (b) by means of measuring the round trip time (RTT). As with TDR, this could be implemented either in the time domain and/or the frequency domain.

According to a second aspect of the present invention, there is provided a method of cutting a pipeline comprising at least the steps of:
(a) cutting the pipeline; and
(b) applying the method of testing the through cut of the pipeline as defined herein to determine the extent of the cut of the pipeline, in particular achieving a through cut of the pipeline.

The cutting of step (a) may be halted to allow for step (b).

The cutting of step (a) may have been completed, or believed to be completed, prior to step (b). Alternatively, the cutting of step (a) may have been substantially completed prior to step (b), to provide the user with information on the extent of cutting still required to achieve the through cut of the pipeline desired.

As discussed above, the pipeline may be at least partially filled with a different medium, which different medium can be used to fill the pipeline at any time or stage during step (a), preferably only after completion of 80% or 90%, etc, of the cut.

In this way, the cutting process can be monitored in real time with confirmation of the completed cut also being given in real time. This in particular allows the cutting tool to be retained in its active cutting position until the cut is confirmed, rather than requiring its return down the pipeline where cutting has been erroneously considered to be completed. Where the cutting is of a drilling conductor below the seabed, it is naturally desired to minimise the operations required such as re-using a cutting tool.

The present invention encompasses all combinations of various embodiments or aspects of the invention described herein. It is understood that any and all embodiments of the present invention may be taken in conjunction with any other embodiment to described additional embodiments of the present invention. Furthermore, any elements of an embodiment may be combined with any and all other elements of any of the embodiments to describe additional embodiments.

BRIEF DESCRIPTION OF THE DRAWINGS

Embodiments of the present invention will now be described by way of example only, and with reference to the accompanying drawings in which.

DESCRIPTION OF PREFERRED EMBODIMENTS

The present invention provides an improved method for testing the through cut of a pipeline, and of a method of cutting a pipeline.

Figure 1:
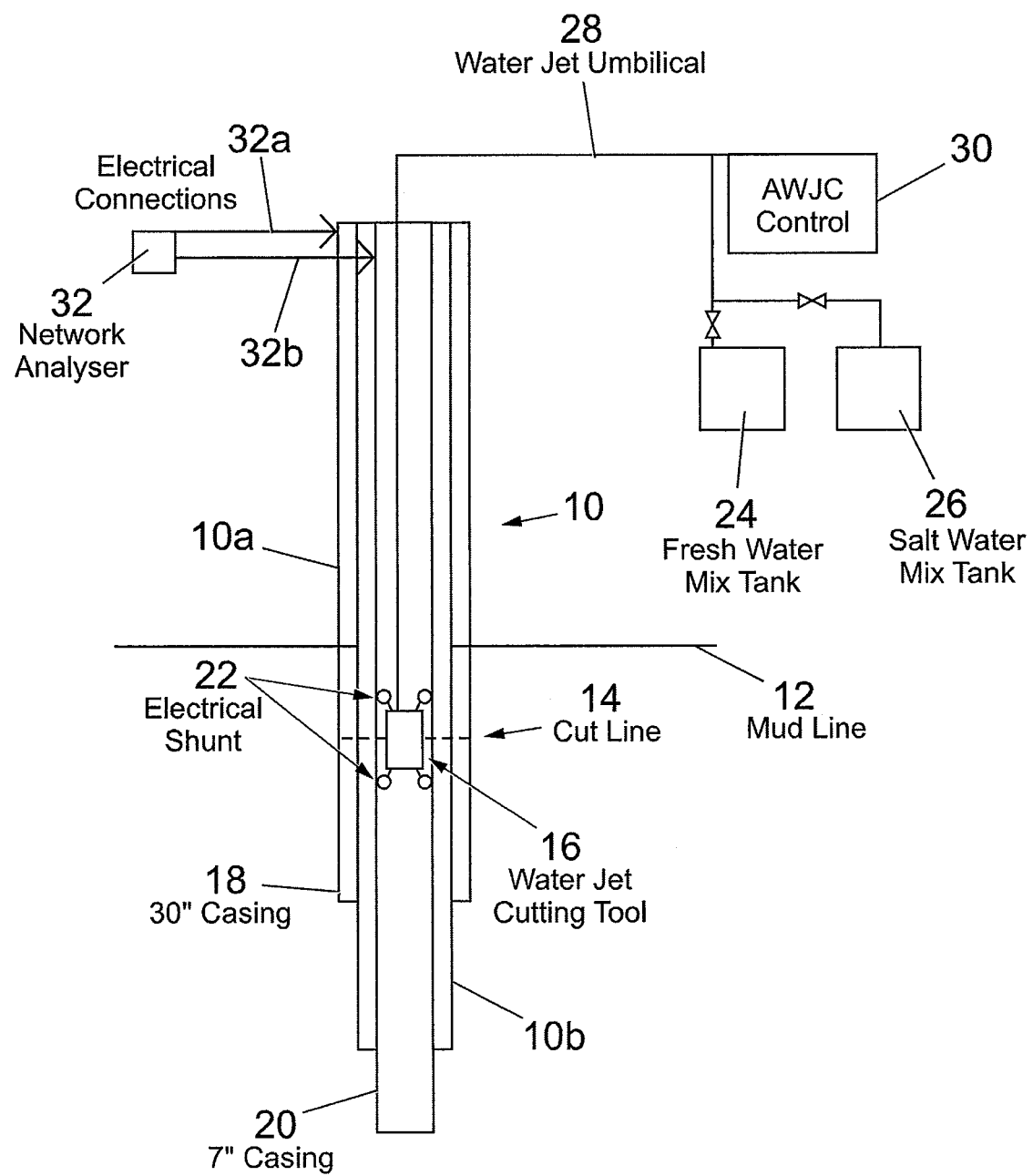
FIG. 1 shows a diagrammatic cross-sectional view of a method of cutting and testing the cut of an under seabed pipeline according to a first embodiment of the present invention.

FIG. 1 shows a pipeline 10 being a drilling conductor. It is desired as part of a decommissioning programme, to remove the upper section 10a of pipeline 10 from 5 m below the mud line 12. For this, an AWJC tool 16 is provided with fresh water and/or salt water from dedicated mixed tanks 24, 26 respectively, through a water jet umbilical 28, and controlled by a control 30 in a manner known in the art. The AWJC passes down the pipeline 10 until it is held in a position to affect a through cut of the upper section 10a of the pipeline 10 from the remaining more deeply embedded section 10b in a manner known in the art along a predetermined cut line 14 beneath the mud line 12.

By way of example, the outer casing of the pipeline 10 could be 133 meters long with 33 meters below the mud line 12. The cut 14 is preferably being carried out 5-9 meters below the mud line 12 by the AWJC tool 16. The outer string 18 of the pipeline 10 could be approximately 76 cm (30") diameter; the inner string 20 is approximately 18 cm (7") diameter. As part of the present invention, an electrical shunt 22 on the AWJC tool 16 connects the two severed parts of the inner string 20.

A method of testing the cut 14 of the pipeline 10 according to one embodiment of the present invention comprises the application of electrical connections 32a and 32b to the outer and inner casings 18, 20, from an electrical volt generator (not shown). Such connections using electrical transmission lines can be carried out by those skilled in the art. The electrical volt generator can provide one or more nanosecond voltage pulses as an electromagnetic signal using TDR, and a network analyser 32 can be used to interpret any received signals, generally being TDR reflected signals, to test for the through cut of the pipeline 10.

Figure 2:
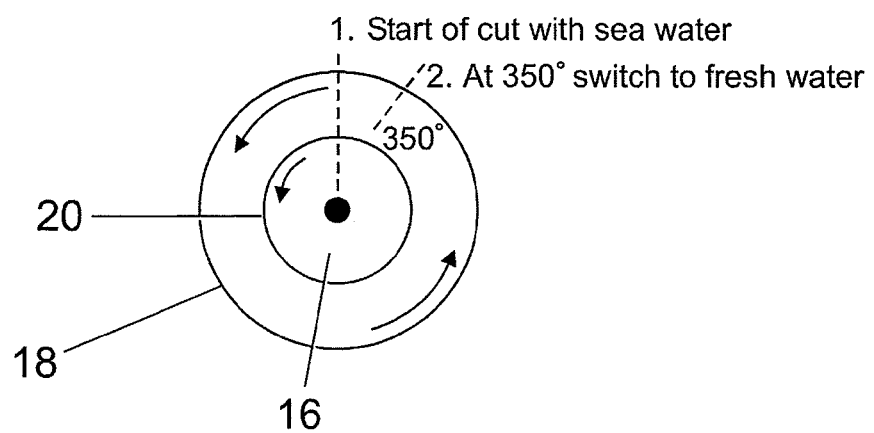
FIG. 2 shows a simplified plan of the pipeline in FIG. 1.

FIG. 2 shows a plan of the rotation of the AWJC tool 16 to perform the cut between the inner and outer casings 20, 18. FIG. 2 also shows a possible extent of the cutting, for example after approximately 320°, 330°, 340° or even 350° traverse of the cut, after or from which seawater in the pipeline 10 can be replaced with fresh water so as to enhance the reflected signal(s) just prior to expected completion of the cut, and at a time when particular monitoring of the completion of the cut is desired.

Figure 3A:
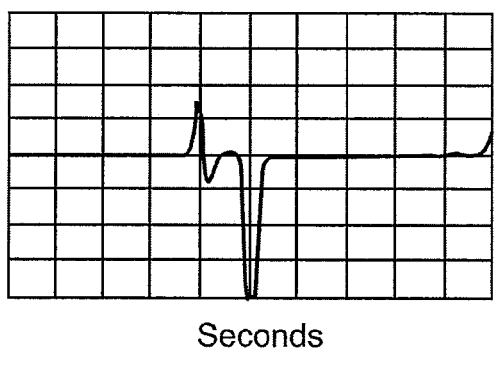
FIGS. 3(a) and (b) are graphs of reflected signals over time from a pipeline being cut and tested according to a first embodiment of the present invention.
Figure 3B:
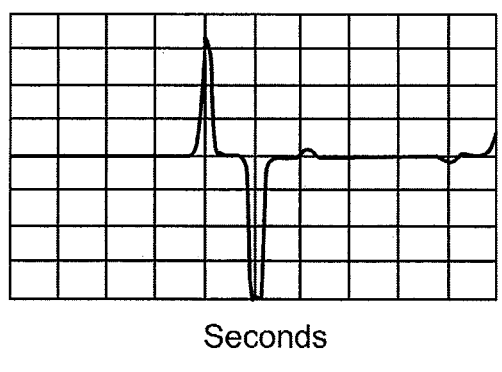

FIG. 3 (a) shows a graph of the reflected signal from an oil pipe conductor pipeline at a time when the cutting thereof is not completed (i.e. a 'partial cut'), whereas FIG. 3 (b) shows the reflected signal after completion of the cut of the same pipeline. The differences between the reflected signals of FIGS. 3 (a) and (b) are clear to the skilled man to confirm that the cut has been completed, and to allow removal of the cutting tool and subsequent operation of a lifting jack without putting undue strain on the lifting jack (because the pipeline is still at least partially connected to the remainder of the more deeply embedded pipeline section).

The behaviour of a typical conductor string can be simulated using a time-domain modelling program. This program implements the Transmission Line Matrix (TLM) method first described in (Johns 1997). For this method the structure to be simulated is represented as a three dimensional array of nodes interconnected by transmission lines. Additional stubs within the nodes are assigned parameters in order to represent the dielectric properties of the various materials within the model. An excitation pulse may be applied at any node within the array. For this work, a Gaussian pulse with a full-width half-magnitude (FWHM) of 30 nanoseconds and a magnitude of 1 volt was used. The internode spacing was chosen to be 5 cm. Concrete is modelled with a Debye relaxation with dielectric properties chosen to match, as well as possible, the Cole-Cole relaxation described in Geophysics 40 1998 89-94 by Robert, A. The DC and infinite frequency relative permittivities were 27 and 10 respectively and a relaxation time-constant, t, of 2 nanoseconds. Steel is assumed to be a perfect electric conductor (PEC), seawater has DC and infinite frequency relative permittivity of 80 and 4.6 respectively, t of 8.3 picoseconds and conductivity of 5 $Sm^1$. The seabed mud had a relative permittivity of 10 and conductivity of 2.5 $Sm^{-1}$.

Figure 4A:
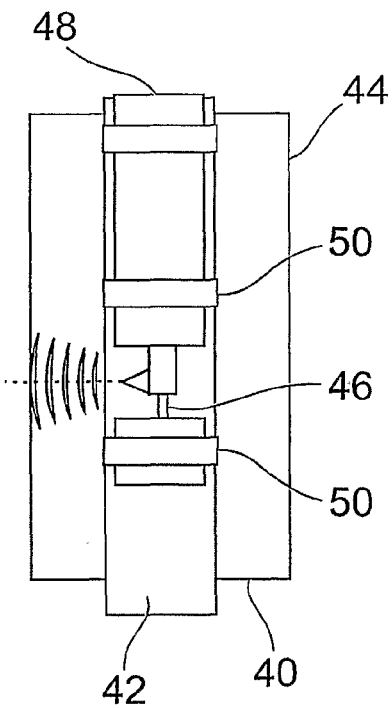
FIGS. 4(a) and (b) show a diagrammatic cross-sectional view and plan view of a method of cutting and testing the cut of an under seabed pipeline according to a second embodiment of the present invention.

FIG. 4(a) shows a second embodiment of the present invention where the electromagnetic signal is applied locally within the waveguide formed by the cut itself. In FIG. 4(a), the pipeline 40 has an inner casing surface 42 and an outer casing surface 44. The signal is applied locally from a rotatable telescopic arm 46 of a suitable pipeline vehicle 48 to close to the cutting head (not shown in FIG. 4), typically at less than 1 m, preferably less than 0.5 m therefrom, in order to improve the accuracy of the cut length measure and the reliability of the through cut detection.

In FIGS. 4(a) and (b), the signal is applied from at least two electrical contacts 50 around the vehicle 48, and located on both sides of the cutting head (above and below), which generates an electromagnetic wave radiating through the cut (not shown in FIG. 4) to radiate out between the contact points and to reflect off the outer casing surface 44. Preferably, these electrical contacts are arranged on the vehicle 48 itself, optionally with tangential distribution. Both two electrical contacts 50 could be connected to an electrical volt generator which can provide one or more nanosecond voltage pulses as an electromagnetic signal using TDR, and to a network analyser which can be used to interpret the received signals to test for the through cut of the pipeline 40.

Figure 4B:
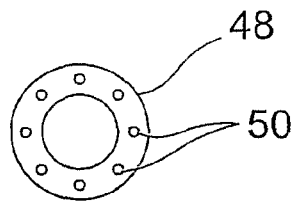

FIG. 4(b) shows that this arrangement can comprise more than two electrical contacts 50, for example sixteen; (8 on both side of the cut, at 45° angular interval). A switching device could be also provided to choose/change the pair of contacts used for emitting the wave (those connected to the pulse generator) and those used for receiving the signal (connected to the network analyser). This increases the number of test sequences and improves the reliability of the through cut analysis.

Figure 5A:
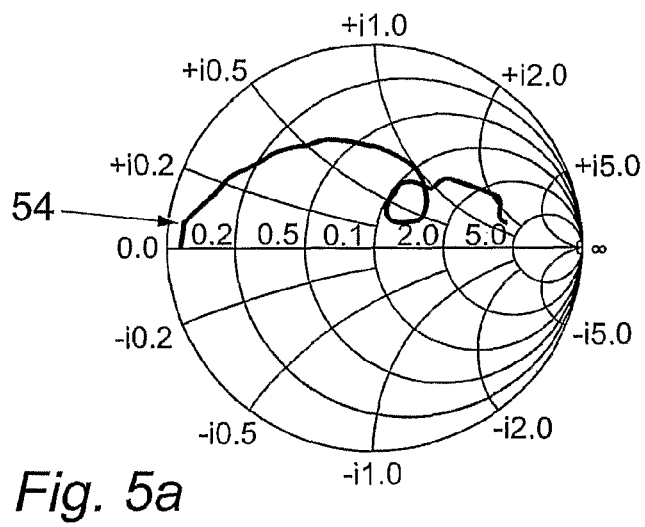
FIGS. 5(a) and (b) are Smith charts of impedance signals from a pipeline being cut and tested according to a second embodiment of the present invention.
Figure 5B:
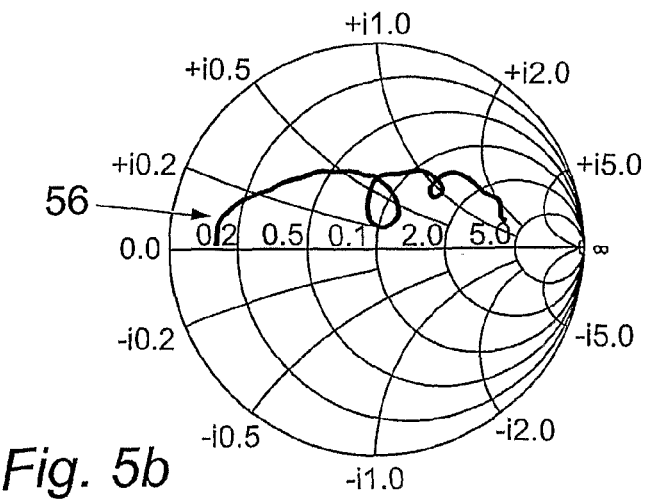

FIGS. 5 (a) and (b) show examples of signals measured by a network analyser on respectively a 99% cut and a 100% cut (i.e. a through cut). FIGS. 5 (a) and (b) are Smith charts referenced to 50Ω of the complex impedance (reflection coefficient) measured between both at least two electrical contacts. The thick lines 54, 56 show the (normalized) impedance variations over a wide frequency range from DC (left end) to 1 GHz (right end) wherein a 1 ns pulse was applied between the upper and lower part of A completely cut inner string of a two string conductor. The conductivity of the grout was assumed to be 2 $Sm^{-1}$ and the conductivity of the mud surrounding the pipe was assumed to be 0.25 $Sm^{-1}$. The steel was assumed to be a perfect electrical conductor.

From a comparison of the thick lines 54, 56 in Figures (a) and (b) show a clear and significant difference, especially in the low frequency range, which leads to a reliable detection of a the through cut of the pipeline 40.

Advantages of the present invention include:
1. The equipment is easily mobilised and managed by one technician.
2. Setup on site is quick with access to at least two of the casings required-one being the external casing.
3. For underwater or below the sea bed operations, all work can be carried out from a secure topside position with no over-the-side or subsea intervention necessary.
4. No prior work or engineering is required on the platform.
5. No rig mounted tension jack is required.
6. No strain is placed on the casings or platform (unlike the load-compensated jack up).
7. The cutting process can be monitored in real time with confirmation of cut given in real time. This allows the cutting tool to remain in position until the cut is confirmed.

Various modifications and variations to the described embodiments of the invention will be apparent to those skilled in the art without departing from the scope of the invention as defined in the claims. Although the invention has been described in connection with specific preferred embodiments it should be understood that the invention as defined herein should not be unduly limited to such specific embodiments.

What is claimed is:

1. A method of testing the through cut of a pipeline comprising at least the steps of:
  (a) applying a cutting process to a region of a pipeline with a cutting tool deployed at a location to effect cutting of the pipeline at the region;
  (b) transmitting an electromagnetic signal through the region of the pipeline after the applying step;
  (c) monitoring any reflected signal resulting from the transmitting during the cutting process; and
  (d) interpreting the reflected signal to determine whether the pipeline is cut through before removing the cutting tool from the location,
    wherein steps (b) and (c) are carried out in the pipeline using an in-line tool.

2. A method as claimed in claim 1, wherein the pipeline is an underwater pipeline, preferably a below the seabed pipeline.

3. A method as claimed in claim 1, wherein the pipeline is a hydrocarbon conductor, preferably an oil drilling conductor.

4. A method as claimed in claim 1, wherein the pipeline is a multi-string pipeline.

5. A method as claimed in claim 1, wherein the electromagnetic signal is one or more voltage pulses or frequency swept sine waves.

6. A method as claimed in claim 1, wherein the method uses time domain reflectometry.

7. A method as claimed in claim 1, wherein the pipeline comprises a medium at the region of the pipeline.

8. A method as claimed in claim 7, further comprising the step of:
   at least partially, preferably fully, replacing the medium in the pipeline with a different medium at the region of the pipeline.

9. A method as claimed in claim 8, wherein the pipeline is an underwater pipeline and the different medium has a lower conductivity than seawater, preferably being freshwater or air.

10. A method as claimed in claim 8, wherein, during the cutting process, the pipeline is filled with the different medium prior to completion of the through cut.

11. A method as claimed in claim 8, wherein the different medium is pressurised.

12. A method as claimed in claim 1, wherein step (b) comprises transmitting an electromagnetic wave along the pipeline, preferably between inner and outer casings of a pipeline having such casings.

13. A method as claimed in claim 1, wherein step (b) comprises transmitting an electromagnetic wave across the pipeline, preferably across the cut in the pipeline.

14. A method as claimed in claim 13, wherein the pipeline is filled with a different medium during step (a), preferably after completion of 80% or 90% of the cut.

15. A method as claimed in claim 1, further comprising the step of:
   at least partially replacing a medium in the pipeline with a different medium at the region of the pipeline.

16. A method as claimed in claim 15, wherein the pipeline is an underwater pipeline and the different medium has a lower conductivity than seawater, preferably being freshwater or air.

* * * * *